Nov. 9, 1971     G. B. HAVILAND     3,618,194
TIRE STUD GUN
Filed Feb. 24, 1969
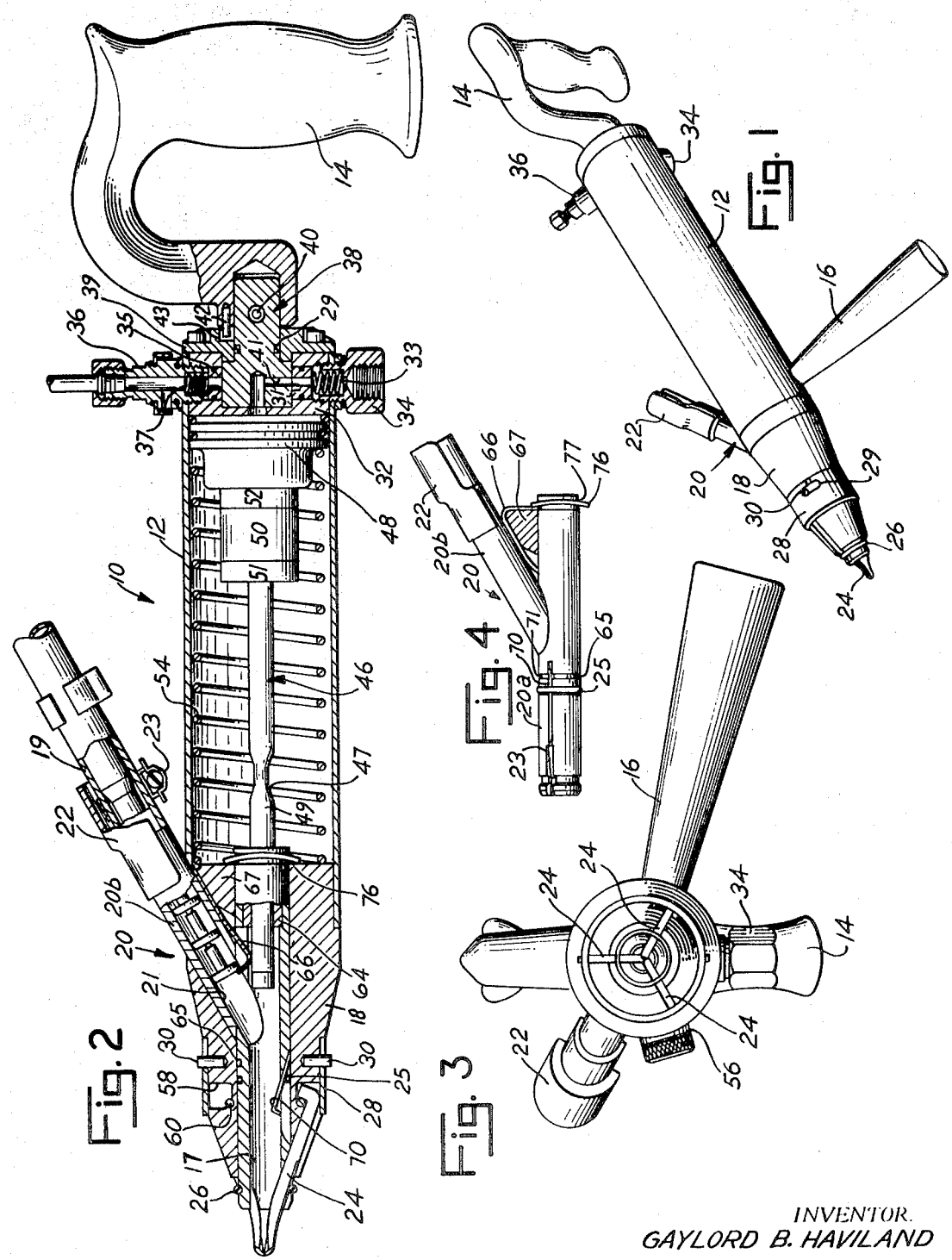
INVENTOR.
GAYLORD B. HAVILAND
BY
*Beir, Freeman & Molinare*
ATTORNEYS

United States Patent Office 3,618,194
Patented Nov. 9, 1971

3,618,194
TIRE STUD GUN
Gaylord B. Haviland, Maineville, Ohio, assignor to
Big Four Automotive Equipment Corporation
Filed Feb. 24, 1969, Ser. No. 801,714
Int. Cl. B23q 7/10
U.S. Cl. 29—212 T    6 Claims

ABSTRACT OF THE DISCLOSURE

A tire stud gun having interchangeable insert tube assemblies for accommodating different sizes of tire studs. Indexing means for permitting one stud at a time to enter the main longitudinally disposed hole within the insert tube assembly are associated with actuator means in the tire stud gun.

BACKGROUND OF THE INVENTION

This invention relates to a tire stud gun, and, more particularly, to a tire stud gun incorporating interchangeable insert tube assemblies for accommodating different sizes of tire studs.

Tire studs comprised of a headed or flanged metal jacket and a hardened carbide insert are being installed in vehicle tires in increasing numbers to increase the traction thereof. Tire stud guns are being used to insert tire studs into blind bores formed in the treads of such vehicle tires. The blind bores may be molded into the tire tread during manufacture or they can be drilled at a later time. As tire treads vary in thickness for smaller passenger cars, regular passenger cars and trucks, for example, so do the tire studs for the different applications vary in size, both in length and head and body diameters. Tire stud guns commonly used are adapted to accommodate only a single basic stud size, for example, smaller passenger cars, and separate tire stud guns are, therefor, required for each of the three categories of tire studs noted above.

An object of the present invention is to provide an improved tire stud gun having replaceable insert tube assemblies, each accommodating a different size tire stud, the insert tube assemblies being speedily changed without the necessity for special tools.

Another object of the present invention is to provide an improved tire stud gun provided with alternate barrels or insert tube assemblies that can be substituted in seconds without special tools, such tire stud gun with alternate barrels being capable of handling both passenger and truck tire studs in sizes from No. 12 through No. 19.

Yet another object of this invention is to provide an improved tire stud gun with alternate barrels or insert tube assemblies having indexing means therein, the indexing means of each insert tube assembly being operable by the actuating means of the tire stud gun. Yet another object of the present invention is to provide an improved tire stud gun with actuator means having slow stroke start to prevent damage to the rod end when it engages the hardened insert of a tire stud and rapid stroke finish to drive the tire stud home into the blind bore in the tire tread. Other objects and advantages will be made more apparent hereinafter.

BRIEF DESCRIPTION OF THE DRAWING

The attached drawing illustrates a presently preferred embodiment of the invention in which:

FIG. 1 is a perspective view of a tire stud gun embodying the present invention;

FIG. 2 is a longitudinal cross-section of the tire stud gun of FIG. 1;

FIG. 3 is a front view of the tire stud gun of FIG. 1; and

FIG. 4 is an elevation view of a barrel or insert tube assembly of the present invention.

DESCRIPTION OF THE PREFERRED EMBODIMENTS

Referring now to FIG. 1, there is illustrated a tire stud gun 10 embodying the present invention. The tire stud gun 10 comprises a cylindrical housing 12 having a handle means 14 at the rear end thereof and a handgrip 16 extending from adjacent the forward end thereof. Secured to the front of the cylinder housing 12 is a head 18 within which is disposed the barrel or insert tube assembly 20 of the present invention. Shield 22 is secured to the barrel 20 to protect the supply tube 19 from damage. Studs are supplied through the supply tube 19 to the barrel 20 in predetermined head-first, end-to-end relationship.

Extending forwardly from and connected to the head 18 are a plurality of opening fingers or jaw means 24 adapted to be inserted into an opening or blind bore in a tire tread for spreading the resilient wall defining the blind bore, so as to permit insertion of a tire stud head-first into the blind bore in the tire tread. An annular resilient closing ring 26 is disposed about the plurality of opening fingers 24 for biasing the fingers inwardly toward one another. Closing ring 26 is adapted to be retained within a recess in the forward end of the head 18. The jaw means 24 are retained in the head 18 by means of a locking collar 28 that is provided with recess means 29 therein cooperating with roll pin or step means 30 secured to the head 18. For example, two recesses and cooperating roll pins may be provided, with one recess and pin being disposed 180° from the other recess and cooperating pin. A quarter turn of the handlocking collar 28 will permit release of the collar 28 from the head 18 and permit replacement of the opening fingers 24.

Turning now to FIG. 2, there is better illustrated the interior construction of the tire stud gun 10. The rear end of the cylinder 12 is closed by an end cap 32. Secured to the end cap 32 are inlet fitting means 34 and outlet fitting means 36. A valve body 38 is rotatably disposed within the end cap 32 and is retained in position by means of the cap plate 39. Resilient seal 29 is provided between the valve body 38 and the cap plate 39. The handle 14 is secured to the valve means 38, as, for example, by means of a roll pin 40, so as to rotate the valve means 38 to connect the opening 41 therein alternatively with the inlet fitting 34 or with the outlet fitting 36. Inlet seal 31 is biased toward engagement with the valve block 38 by spring 33 and outlet seal 35 is biased toward engagement with the valve body 38 by spring 37. The stop 42 which is affixed to the handle cooperates with a recess 43 in the cap plate 39 to limit the rotation of the handle 14 and valve means 38 within the end cap 32.

Reciprocatingly disposed within the tire stud gun 10 is a piston and rod assembly 46 which includes a piston 48 and a rod 49 secured thereto and extending into the head 18. Provided on the piston rod are a pair of resilient bumpers 51 and 52 separated by a spacer 50. The bumpers 51 and 52 are provided to cushion the shock as the piston 48 moves to its leftmost position as seen in FIG. 2. The piston 48 is adapted to be biased toward the right to its starting position by the spring 54 within housing 12.

The head 18 is secured to the forward end of the cylindrical housing 12 by means of the handgrip 16 which is threadedly secured between the cylindrical housing 12 and head 18 and by means of the set screw means or knurled knob 56 (FIG. 3) which extends through the cylindrical housing 12 into engagement with the head.

The opening fingers 24 are generally L-shaped and the small hooked portion at the rear end of each opening finger is secured within a recess 58 in the head 18. A metal, for example, steel ring 60 is disposed between the head 18 and the small, hooked end of the opening fingers 24 for accommodating some wearing of the parts during the operation thereof. As aforenoted, the O-ring or closing ring 26 biases the three opening fingers 24 toward one another. It is seen from FIG. 2 that there are a pair of roll pins 30 secured to the head 18 on opposite sides thereof for cooperating with recesses in the locking collar for retaining the locking collar 28 in its locked position, so as to retain the hooked ends of the opening fingers 28 in the recesses 58 within the head 18.

Secured within the head 18 is the barrel or insert tube assembly 20, which is a feature of the present invention. The barrel 20 includes a longitudinally disposed tubular member 20a and an inlet member 20b secured to the member 20a at an angle with respect thereto. Supply conduit 19 adapted to be connected to a suitable source of studs in head-first, end-to-end relationship is secured to the inlet tube 20b by a suitable clamp 23.

Disposed in the rear end of the tubular member 20a is a bushing 64 for journaling the front end of the piston rod 49.

Secured to the inlet tube 20b of the insert tube assembly 20 is an index spring 66 which is adapted to extend into the passageway 21 within the inlet tube 20b for restricting the flow of tire studs therethrough. The index spring 66 includes a portion positioned over support block 67 and disposed between the insert tube 20b and an inclined surface of the support block. The rear portion of the index spring 66 abuts the rear of the support block. The index spring 66 is held in place on barrel 20 by means of retaining ring 76, which is substantially C-shaped. In use, the opening between the ends of the C-shaped portions of the retaining ring 76 should be disposed downwardly or centered opposite the feed tube 20b.

The index spring 66 is adapted to be engaged by the piston rod 49 in the position shown in FIG. 2 so as to extend into the passage 21 to prevent further movement of studs from member 20b into member 20a. The piston rod 49 includes a reduced or recessed portion 47 and when the head of the index spring 66 extends into the recessed portion 47, the tip thereof will be outside of the passage 21 and a tire stud will be permitted to enter the passage 19 within the tubular part 20a of the insert tube assembly 20. The reduced portion 47 functions as a cam means for actuating the index spring 66 during movement of rod 49.

Within the passage 19 of the tubular part 20a are three positioning springs 70 that are spaced radially at 120° from one another for suitably retaining and positioning a tire stud that has moved from the passage 21 into passage 19. Each spring 70 has a tang or projection 71 (FIG. 4) extending transversely from the end thereof, such tang being disposed in recess 72 in the body portion 20a. The O-ring 25 disposed about body portion 20a and positioning springs 70 retains the springs in position as shown in FIG. 1.

In operation, the piston rod 49, which has a hardened front end 53, will be actuated to the left upon introduction of air pressure rearwardly of the piston 48 to move the piston rod 49 to the left forcing the tire stud through the opening fingers 24 into a blind bore in a tire. When the index spring 66 drops into the recess 47 the tip of the index spring 66 will be withdrawn from passageway 21 to permit a tire stud head to move past the tip of the index spring 66. Upon withdrawal of the piston rod 49 to the right as viewed in FIG. 2, the tire stud will drop into the passage 19 when the front end of the piston rod 49 has moved rearwardly past the opening from passageway 21 to the position shown in FIG. 2, for example. As the piston rod 49 began its rearward movement the index spring 66 was cammed by the surface defining recess 47 and moved upwardly to the position shown in FIG. 2 to retain the next succeeding stud within the passageway 21.

In normal use the gun jaws or opening fingers 24 are inserted to the bottom of the blind bore in the tire tread and the handle 14 is rotated to properly position the rotary valve means 38 to communicate the chamber 45 with the supply pressure from inlet 34 for forcing the piston rod 49 forwardly so as to push the tire stud into the blind bore in a tire tread. With the tire stud gun 10 retained in position the operating handle 14 is turned and the tire stud gun 10 is allowed to push itself out of the blind hole as the tire stud is inserted. This will permit correct alignment and installation of the tire stud to the proper depth. After the tire stud gun 10 has ejected the stud and has pushed itself out of the blind bore in the tire, then the handle 14 should be returned to communicate passageway 41 to outlet 36 to exhaust any remaining pressure. Handle 14 is then returned to a neutral starting position.

In FIG. 4 there is illustrated an elevation view of a barrel or tube insert assembly 20. It is seen that the members 20a and 20b are joined to form a unitary member 20. Provided in the front of the portion 20a of the barrel 20 are recesses 23 for receiving the jaws or opening fingers 24. The bores in barrel positions 20a and 20b are adapted to accommodate a stud of given size or studs of a limited range and it will be undersood that if it is desired to utilize either a larger or smaller stud, that one barrel will be interchanged with another suitable barrel.

The support block 67 supports the index spring 66 and the support block and index spring are retained on the barrel 20 by retaining ring 76 engaging in a recess 77 at the rear of the barrel body portion.

The barrel is interchanged in the following fashion. The handgrip 16 and the kurled screw 56 are removed from the gun 10 allowing the head 18 and barrel 20 therein to be removed from the cylindrical housing 12. The insert can be removed from head 18 by pulling from the rear. A new barrel 20 can be inserted into the head 18 and the head and new barrel are then joined to the cylinder in a reverse manner from the disassembly, with the insert tube 20b positioned in a slot at the front of housing 12.

There has been provided by the present invention an improved tire stud gun mechanism adapted to accommodate a plurality of interchangeable barrels including indexing means for accommodating a wide range of tire studs. The barrels may be interchanged in seconds without tools, merely by unscrewing the handgrip and the thumb screw, withdrawing the head from the cylindrical housing, and substituting a new barrel for the old.

While I have described preferred embodiments of my invention, it will be understood that the invention is not limited thereto, but may be otherwise embodied within the scope of the following claims.

I claim:

1. In a tire stud gun for inserting tire studs having a body with a head at one end headfirst into blind bores in a tire, said tire stud gun comprising a head, means supplying tire studs to be inserted into said bores in a tire to said head, opening fingers on said head adapted to engage said blind bores to widen same for reception of a tire stud, and actuator means including a housing secured to said head and means within said housing for moving a stud from said supplying means through said opening fingers into a blind bore, the improvement comprising an insert tube assembly detachably secured in said head, said insert tube assembly including an inlet tube member connected to said supplying means and having a passageway therein, an axially disposed tubular member having a hole therein communicating with said inlet tube passageway for receiving studs therefrom, and index means for releasing studs one at a time from said inlet tube passageway into said hole, said stud moving means operable in said hole for moving said stud through said hole into said blind bore in a tire, the index means being operatively connected to said stud moving means.

2. A tire stud gun as in claim 1 wherein the stud moving means comprises a piston and rod assembly, said rod of said assembly including cam means for actuating the index means to selectively release studs one at a time from said inlet tube passageway into said hole in said insert tube assembly.

3. A tire stud gun as in claim 1 wherein means are provided for detachably securing the insert tube assembly to the head, whereby a different insert tube assembly may be substituted to accommodate different size tire studs, without substitution of the head and with use of the same actuator means.

4. A tire stud gun as in claim 3 wherein the head is detachably secured to said housing.

5. A tire stud gun as in claim 1 wherein the index means includes a leaf spring having a portion movable into said inlet tube passageway to retain studs and movable from said inlet tube passageway to release a single stud, the leaf spring being positioned over a support member and the leaf spring and support member being retained on the insert tube assembly by a retaining ring.

6. A tire stud gun as in claim 5 wherein said leaf spring portion is biased from the inlet tube passageway and is moved into the inlet tube passageway for retaining the studs by the stud moving means which comprises a piston and rod assembly, the rod of such assembly engaging with said leaf spring to move same.

References Cited
UNITED STATES PATENTS

| | | | |
|---|---|---|---|
| 3,258,835 | 7/1966 | Boggild | 29—212 T |
| 3,348,291 | 10/1967 | Niedzwiecki | 29—212 T |
| 3,387,352 | 6/1968 | Walter | 29—212 T |
| 3,475,806 | 11/1969 | Center | 29—212 T |

JOHN F. CAMPBELL, Primary Examiner

D. P. ROONEY, Assistant Examiner